(12) United States Patent
Boettner et al.

(10) Patent No.: US 7,984,118 B2
(45) Date of Patent: Jul. 19, 2011

(54) PERSISTENT CONFIGURATION IN A MULTIPLE PROCESSOR REPAIRABLE SYSTEM

(75) Inventors: Fred Henry Boettner, Roanoke, VA (US); Stephen J. Sullivan, Roanoke, VA (US); Craig William Moyer, Roanoke, VA (US); Gary Kraterfield, Roanoke, VA (US); Robert Kirby, Roanoke, VA (US); Mark E. Shepard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 1432 days.

(21) Appl. No.: 11/011,935

(22) Filed: Dec. 14, 2004

(65) Prior Publication Data
US 2006/0129986 A1   Jun. 15, 2006

(51) Int. Cl.
*G06F 15/177* (2006.01)
(52) U.S. Cl. ........ 709/220; 709/221; 709/222; 709/223; 709/249; 370/254; 370/270; 370/228; 370/384
(58) Field of Classification Search ........... 709/220–222
See application file for complete search history.

(56) References Cited

U.S. PATENT DOCUMENTS

| | | | | |
|---|---|---|---|---|
| 6,006,171 | A  * | 12/1999 | Vines et al. | 702/184 |
| 6,029,196 | A  * | 2/2000 | Lenz | 709/221 |
| 6,151,684 | A  * | 11/2000 | Alexander et al. | 714/4 |
| 6,286,038 | B1 * | 9/2001 | Reichmeyer et al. | 709/220 |
| 6,718,383 | B1 * | 4/2004 | Hebert | 709/224 |
| 7,257,817 | B2 * | 8/2007 | Cabrera et al. | 719/310 |
| 2002/0188887 | A1* | 12/2002 | Largman et al. | 714/13 |
| 2005/0055427 | A1* | 3/2005 | Frutiger et al. | 709/220 |

* cited by examiner

*Primary Examiner* — Salad Abdullahi
*Assistant Examiner* — Hua Fan
(74) *Attorney, Agent, or Firm* — Ohlandt, Greeley, Ruggiero & Perle, L.L.P.

(57) ABSTRACT

A control system having a host computer and one or more control computers connected to an interface for control of a process or machinery. The control computers are capable of automatically initiated network address assignment and configuration when powered up after installation. The network address is based on a location identifier situated in the interface that corresponds to a specific connection thereof to the control computer. The control computer reads the location identifier from the interface and requests a network address. The host computer assigns the network address based on the location identifier. Configuration of the control computer then proceeds. The procedure applies to newly installed control computers, whether first time installment or a replacement for a failed control computer.

22 Claims, 4 Drawing Sheets

PERSISTENT CONFIGURATION IN A MULTIPLE PROCESSOR REPAIRABLE SYSTEM

BACKGROUND OF INVENTION

1. Field of the Invention

The present disclosure relates to processing systems. More particularly, the present disclosure relates to multiple computers of a control system that acquire signals from and/or supply signals to a machine or a process being monitored or controlled and to methods for configuring the computers.

2. Discussion of the Background Art

Repair of a multiple processor system typically includes steps for the physical replacement of a failed processor and subsequent re-establishment of required configuration information. The configuration information typically provides customization of the software running on each processor. Human interaction typically is needed to determine the correct configuration information to load into the system. The human interaction may be through a hardware jumper selection, the operation of a configuration program, or other methods. In any of these methods, the re-establishment of the configuration information may impede the repair process. For example, the system may be shut down or be unusable while a replacement processor is being substituted for the failed processor. Thus, a problem to be solved is how to re-establish the correct configuration information in the replacement processor.

Accordingly, there is a continuing desire for a multiple processor system in which a processor can be configured without the need for human intervention.

Also, there is a desire for continued operation of a multiple processor system during the time that a failed processor is being removed and a replacement processor is being installed.

BRIEF DESCRIPTION OF THE INVENTION

The disclosure describes a technical solution to the problem of how to re-establish the correct configuration in a replacement computer. The technical solution is an arrangement by which the configuration data, once initially established, is saved based on a relationship of a connecting location of a failed computer to an interface. A replacement computer reads a unique identifier associated with the location, which is used to access the configuration data. This solution results in an automated configuration process for the replacement computer and eliminates the possibility of a system failure due to improper configuration of a replacement computer.

A first method embodiment configures a first computer by obtaining a location identifier from an interface that is connected to the first computer. The location identifier is provided to a second computer. The first computer is configured with configuration data provided by the second computer, the configuration data including a network address for the first computer that is related to the location identifier.

A second method embodiment configures a control computer, by assigning a network address to the control computer based on a location identifier of a connection of the control computer to an interface with a controlled and/or monitored process or machinery. A relationship of the location identifier with the network and a configuration data is saved. The configuration data is provided to the control computer.

A control computer embodiment is for a control system that includes a host computer and an interface arranged to control a process or one or more machines. The control computer embodiment includes at least a first program instruction that causes a processor of the control computer to obtain a location identifier from the interface. At least a second program instruction causes the processor to provide the location identifier to the host computer. At least a third program instruction causes the processor to configures the control computer with configuration data provided by the host computer, wherein the configuration data includes a network address for the control computer that is related to the location identifier.

A host computer embodiment is for a control system that includes a control computer and an interface arranged to control a process or one or more machines. The host computer embodiment includes at least a first program instruction that causes the processor to assign a network address to the control computer based on a location identifier of a connection of the control computer to the interface. At least a second program instruction causes the processor to save a relationship of the location identifier with the network and a configuration data. At least a third program instruction causes the processor to provides the configuration data to the control computer.

DETAILED DESCRIPTION OF THE PREFERRED EMBODIMENT

Figure 1:
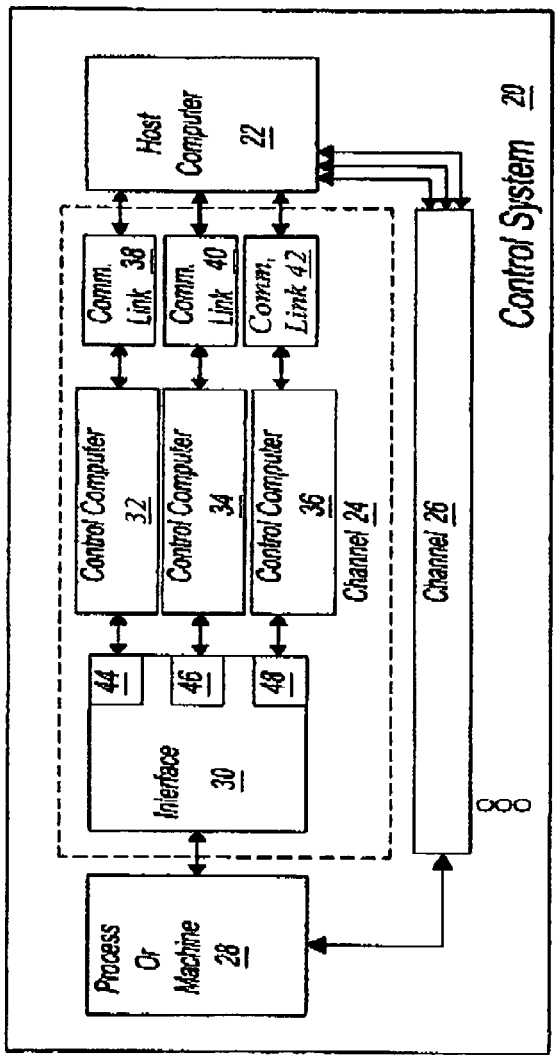
FIG. 1 is a block diagram of an exemplary embodiment of a multi-computer control system.

Referring to the drawings and in particular to FIG. 1, a control system is illustrated by way of reference numeral 20. Control system 20 includes a host computer 22 and one or more channels 24 and 26 that are arranged to monitor and/or control a process or one or more machines 28. Although only two channels are shown, it will be apparent to those skilled in the art that more channels can be used. As each of the channels 24 and 26 are substantially identical, only channel 24 will be described in detail.

Channel 24 includes an interface 30, control computers 32, 34 and 36 and communication links 38, 40 and 42. Interface 30 includes one or more connections to process or machine 28 and redundant connections to control computers 32, 34 and 36. For example, the signals being monitored by interface 30 are transferred via three paths in FIG. 1. It will be apparent to those skilled in the art that more or less paths may be used. Interface 30, for example, may be a terminal board that accepts wiring from process or machine 28 and electrically connects to one or more control computers 32, 34 or 36.

Interface 30 includes a unique electronic identifier (ID) 44 for the connection to control computer 32, a unique electronic identifier (ID) 46 for the connection to control computer 36 and a unique electronic identifier (ID) 48 for the connection to control computer 38. Electronic IDs 44, 46 and 48 may be provided simply by coded wiring, a memory (e.g., a ROM, an EPROM) and the like.

Signals acquired by interface 30 are conveyed to control computers 32, 34 and 36, which condition the signals and process them for transfer to host computer 22. For example, each of the control computers 32, 34 and 36 may include an analog to digital converter that converts analog signals to digital form for processing and transfer to host computer 22.

Communication links 38, 40 and 42 provide independent signal paths between host computer 22 and each of the control computers 32, 34 and 36. For example, communication links 38, 40 and 42 may be implemented in an Ethernet topology and protocol, although other topologies and protocols may be used.

Figure 2:
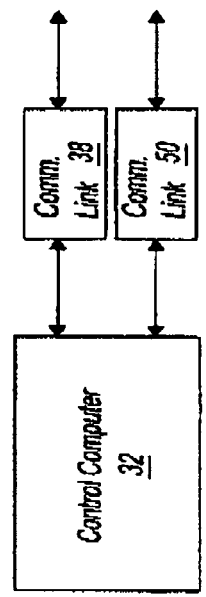
FIG. 2 is a block diagram of an alternative network between a control computer and the host computer of the control system of FIG. 1.

Referring to FIG. 2, redundant communication links may also be used. Thus, control computer 32 may be provided with communication link 38 and an independent communication link 50 for redundancy purposes. Control computers 34 and 36 may be provided with similar redundant communication links.

Control computers 32, 34 and 38 may be any suitable computing devices. For example, the computing device may be implemented as a single special purpose integrated circuit, such as an ASIC, having a main or central processor section for overall, system-level control, and separate sections dedicated performing various different specific combinations, functions and other processes under control of the central processor section. It will be appreciated by those skilled in the art that the computing device can also be implemented using a variety of separate dedicated or programmable integrated or other electronic circuits or devices, such as hardwired electronic or logic circuits including discrete element circuits or programmable logic devices, such as PLDs, PALs, PLAs or the like. Also, the computing device can also be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the flow charts, as illustrated in the application, can be used as the control.

Figure 3:
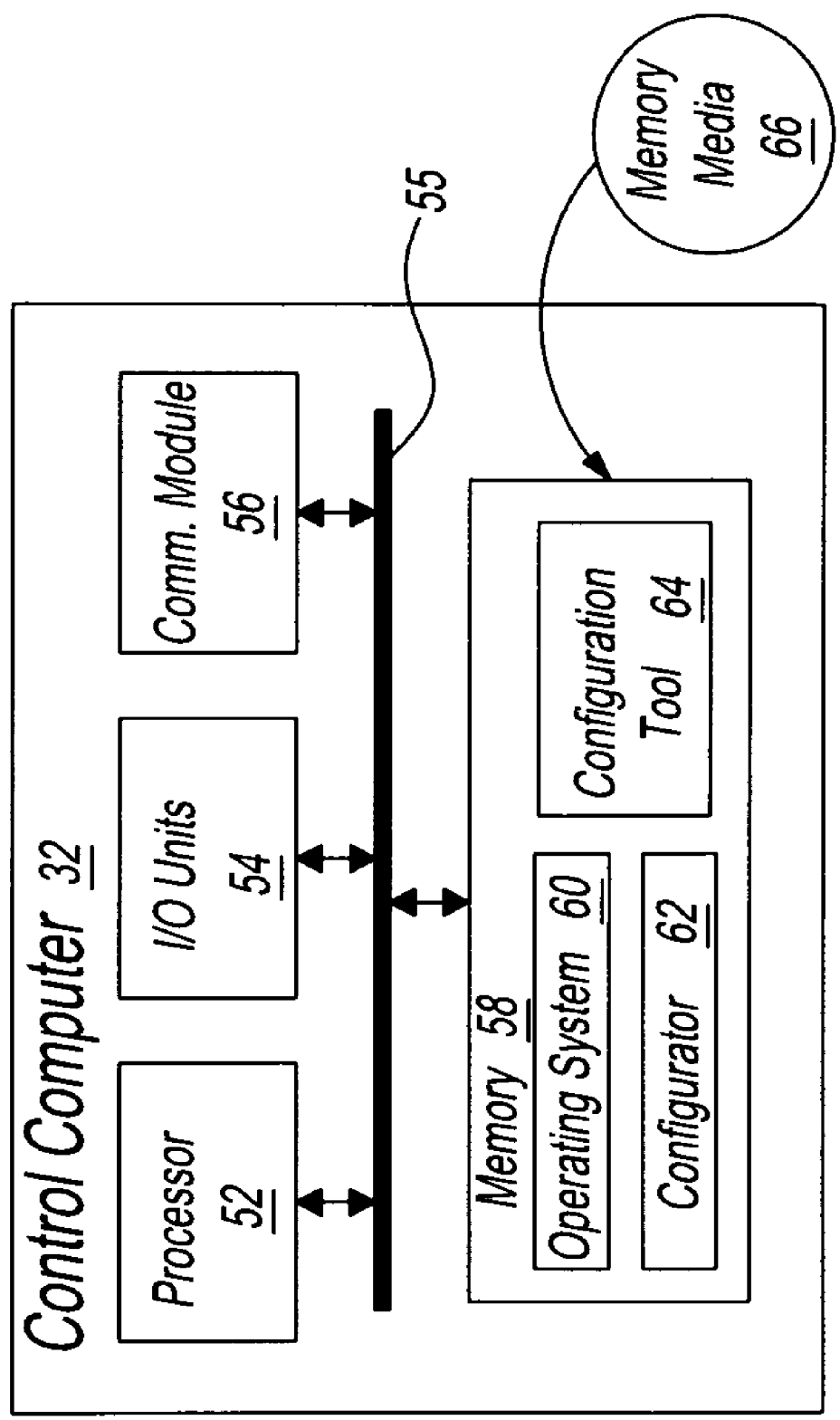
FIG. 3 is a block diagram of the control computer of FIG. 1.

Referring to FIG. 3, an exemplary control computer 32 includes a processor 52, an input/output (I/O) units 54, a communication module 56 and a memory 58 that are all interconnected by a bus 55. I/O units 54 include the aforementioned analog to digital converter and other signal shaping circuits to condition signals supplied by interface 30 for use by control computer 32 and to condition signals to be supplied from control computer 32 to interface 30.

Communication module 56 includes the circuit topology and protocol necessary to communicate via communication link 38 and/or communication link 50, if used. Memory 58 includes any suitable type of memory, such as random access memory, read only memory, flash memory, and other types of memory.

Control computer 32 also includes an operating system 60, a configurator 62 and a configuration tool 64 that are stored in memory 58. Operating system 60 causes processor 52 to execute configurator 62 to communicate with host computer 22 to obtain a network address and to be configured with the use of configuration tool 64. Configuration tool 64 may be any suitable configuration tool, known presently or in the future. Configurator 62, as well as other programs, may be stored on a memory media 66 that can be used to load configurator 62 into memory 58.

Figure 4:
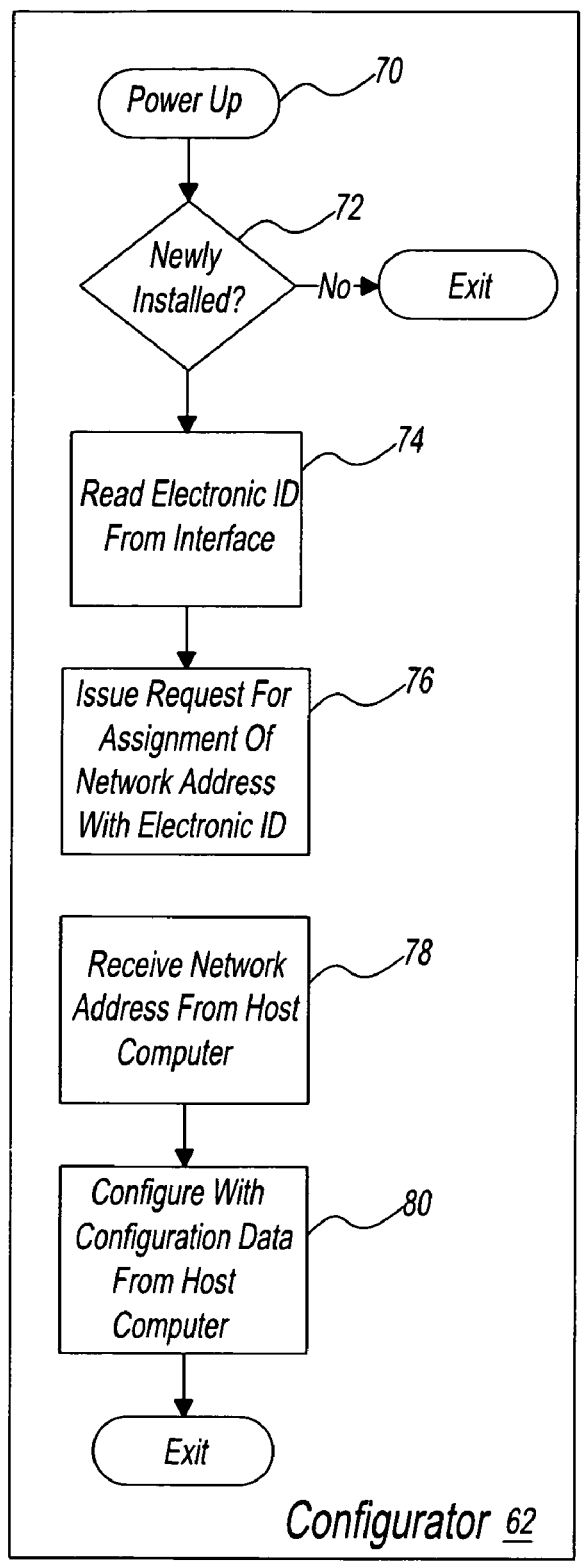
FIG. 4 is a flow diagram of the configurator of the control computer of FIG. 3.

Referring to FIG. 4, configurator 62 begins at step 70 upon control computer 32 being powered up. At step 72, it is determined whether control computer is newly installed, as would be the case at the time of initial installation or replacement installation. If not newly installed, configurator 62 is exited. If newly installed, step 74 reads unique electronic ID 44 from interface 30. At step 76, a request is issued to host computer 22 for assignment of a network address. The request includes unique electronic ID 44. At step 78, the assigned network address is received from host computer 22. At step 80, configuration tool 64 is caused to configure control computer 32 with configuration data that is received from host computer 22 and that is unique to the control computer connected to the connections of interface 30 that are associated with electronic ID 44. When the configuration is completed, configurator 62 is exited. The configuration data, for example, may include network address, signal scaling and operating rate. It will be apparent to those skilled in the art that the sequence order of the steps of configurator 62 can be changed without altering the scope of the disclosure. For example, step 72 can be performed at any point in the sequence order prior to step 80. It will also be apparent to those skilled in the art that configurator 62 includes one or more program instructions for each step 72, 74, 76, 78 and 80.

Figure 5:
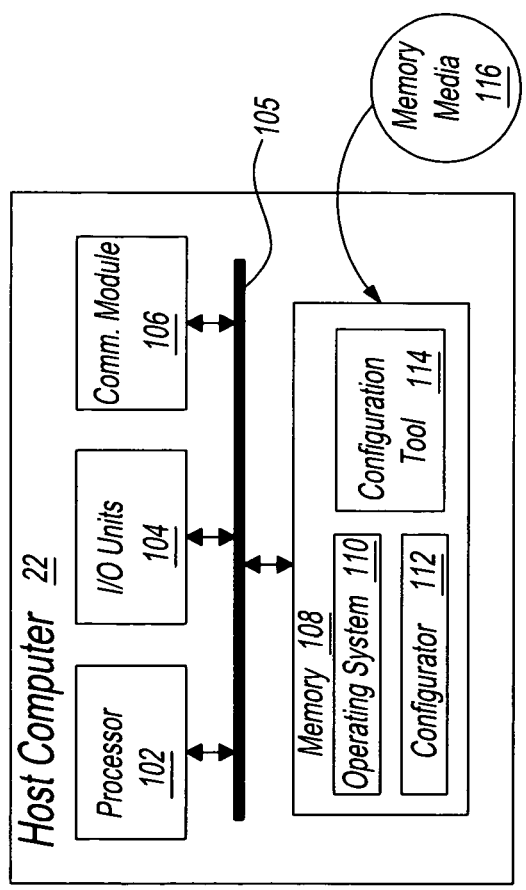
FIG. 5 is a block diagram of the host computer of the control system of FIG. 1.

Referring to FIG. 5, an exemplary host computer includes a processor 102, an input/output (I/O) units 104, a communication module 106 and a memory 108 that are all interconnected by a bus 105. I/O units 104 include, for example, a keyboard, mouse, display and printer. It will be apparent to those skilled in the art that host computer 22 may be one of several host computers configured to control and monitor process or machine 28 via channels 24 and 26.

Communication module 106 includes the circuit topology and protocol necessary to communicate via communication link 38 and/or communication link 50, if used. Memory 108 includes any suitable type of memory, such as random access memory, read only memory, flash memory, and other types of memory.

Host computer 22 also includes an operating system 110, a configurator 112 and a configuration tool 114 that are stored in memory 108. Operating system 110 causes processor 102 to execute configurator 112 to communicate with host processor 22 to obtain a network address and to be configured with the use of configuration tool 114. Configuration tool 114 may be any suitable configuration tool, known presently or in the future. Configurator 112, as well as other programs, may be stored on a memory media 116 that can be used to load configurator 112 into memory 108. Configurator 62 could also be stored in memory media 116, loaded into memory 108 and then downloaded into memory 58 of control computers 32, 34 and 36.

Figure 6:
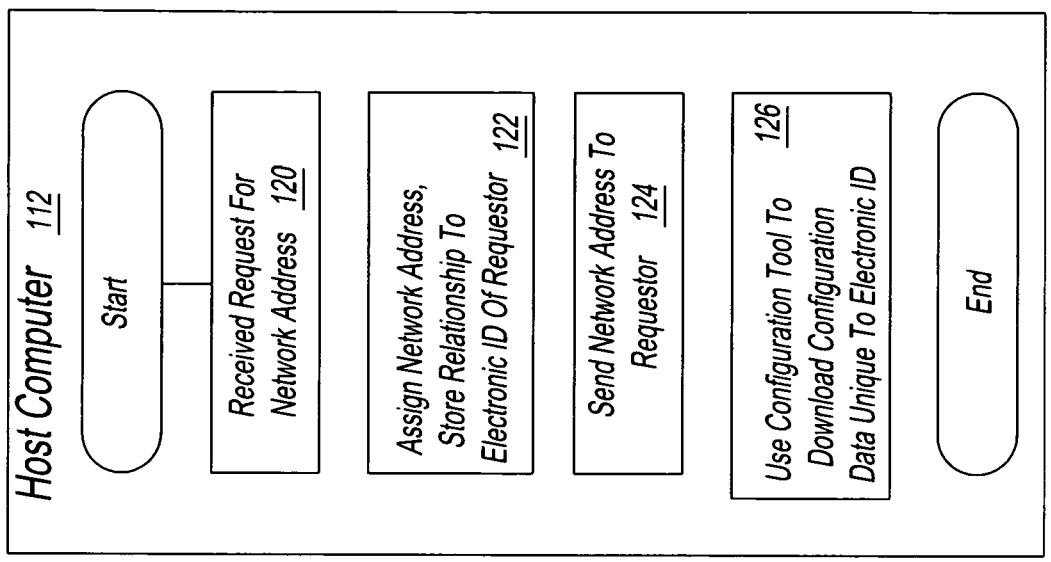
FIG. 6 is a flow diagram of the configurator of the host computer of FIG. 5.

Referring to FIG. 6, configurator 112 at step 120 receives a request from control computer 32 for a network address. The network address is assigned at step 122 and the relationship between the electronic ID of the requestor, the network address and the configuration data is stored. At step 124, the network address is sent to the requestor.

At step 126 the configuration tool 114 is used to download to control computer 32 configuration data that is unique to the electronic ID of the requestor. It will be apparent to those skilled in the art that configurator 112 includes one or more program instructions for each step 120, 122, 124 and 126.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A method for configuring a first redundant control computer of a plurality of redundant control computers of a control system for controlling a process or one or more machines, said control system further including a host computer, a plurality of redundant control computers, an interface arranged to control said process or one or more machines, a plurality of redundant connections between said interface and said plurality of redundant control computers, wherein signals for monitoring and or controlling said process or one or more machines are transferred via said interface and said redundant connections between said process or one or more machines and said plurality of redundant control computers, each of said redundant control computers including a processor, a memory and a configurator which is stored in said memory, wherein one of said plurality of redundant control computers is a replacement redundant control computer that is electrically connected to a particular one of said redundant connections which was previously electrically connected to a failed redundant control computer, said method comprising:
    obtaining a location identifier from said interface, wherein said location identifier identifies said particular redundant connection that is connected to said replacement redundant control computer;
    providing said location identifier to said host computer; and
    configuring said replacement redundant control computer with configuration data provided by said host computer, wherein said configuration data includes a network address for said replacement redundant control computer that is related to said location identifier and wherein a second redundant control computer carries on said monitoring and controlling while said failed redundant control computer is being replaced by said replacement redundant control computer and said replacement redundant control computer is being configured.

2. The method of claim 1, wherein said obtaining step is automatically performed in response to said replacement redundant control computer being powered up.

3. The method of claim 1, wherein said configuration data is substantially identical to a configuration data of said failed redundant control computer.

4. The method of claim 1, wherein said replacement and second redundant control computers communicate via a network selected from the group consisting of: single link and two or more links.

5. The method of claim 1, further comprising:
    obtaining an additional location identifier from said interface for at least one additional redundant control computer of said plurality of redundant control computers that is connected to said interface;
    providing said additional location identifier to said additional redundant control computer; and
    receiving additional configuration data for said additional redundant control computer, wherein said additional configuration data includes an additional network address for said additional redundant control computer that is related to said additional location identifier.

6. The method of claim 5, wherein said location identifier and said additional location identifier are unique to said particular and second redundant connections of said interface to which said replacement redundant control computer and said additional redundant control computer are connected, respectively.

7. A method for configuring a host computer that includes a processor and a memory and that is part of a control system that includes a plurality of redundant control computers, an interface arranged to control said process or one or more machines, a plurality of redundant connections between said interface and said plurality of redundant control computers, wherein signals for monitoring and or controlling said process or one or more machines are transferred via said interface and said redundant connections between said process or one or more machines and said plurality of redundant control computers, wherein one of said plurality of redundant control computers is a replacement redundant control computer that is electrically connected to a particular one of said redundant connections which was previously electrically connected to a failed redundant control computer, said method comprising:
    assigning a network address to replacement redundant control computer based on a location identifier of said particular redundant connection, wherein said particular redundant connection is connected to said replacement redundant control computer;
    saving a relationship of said location identifier with said network and a configuration data; and
    providing said configuration data to said replacement redundant control computer, wherein a second redundant control computer of said plurality of redundant control computers carries on said monitoring and controlling while said failed redundant control computer is being replaced and said replacement redundant control computer is being configured.

8. The method of claim 7, wherein said configuration data is substantially identical to a configuration data of said failed redundant control computer.

9. The method of claim 7, wherein said host computer further includes a communication unit that has the capability to communicate with said replacement redundant control computer via a network selected from the group consisting of: single link and two or more links.

10. The method of claim 7, further comprising:
    assigning a second network address to an additional redundant control computer of said plurality of redundant control computers based on an additional location identifier of a second redundant connection of said plurality of redundant connections, wherein said second redundant connection is connected to said additional control computer;
    saving a relationship of said second location identifier with said network and an additional configuration data; and
    providing said additional configuration data to said additional redundant control computer.

11. The method of claim 10, wherein said location identifier and said additional location identifier are unique to said particular and second redundant connections of said interface to which said replacement redundant control computer and said additional redundant control computer are connected, respectively.

12. A control system for controlling a process or one or more machines, said control system comprising:
- a host computer;
- a plurality of redundant control computers;
- an interface arranged to control said process or one or more machines;
- a plurality of redundant connections between said interface and said plurality of redundant control computers, wherein signals for monitoring and or controlling said process or one or more machines are transferred via said interface and said redundant connections between said process or one or more machines and said plurality of redundant control computers;
- each of said redundant control computers comprising a processor, a memory and a configurator which is stored in said memory, wherein one of said plurality of redundant control computers is a replacement redundant control computer that is electrically connected to a particular one of said redundant connections which was previously electrically connected to a failed redundant control computer, wherein a second one of said redundant control computers carries on said monitoring and controlling while said failed redundant control computer is being replaced by said replacement redundant control computer and said replacement redundant control computer is being configured, and wherein the processor of said replacement redundant control computer executes:
- at least a first program instruction of said configurator to obtain a location identifier from said interface; wherein said location identifier identifies said particular redundant connection that is connected to said replacement redundant control computer;
- at least a second program instruction of said configurator to provide said location identifier to said host computer; and
- at least a third program instruction of said configurator to configure said replacement redundant control computer with configuration data provided by said host computer, wherein said configuration data includes a network address for said replacement redundant control computer that is related to said location identifier.

13. The control system of claim 12, wherein said processor automatically obtains said location identifier in response to said replacement redundant control computer being powered up.

14. The control system of claim 12, wherein said configuration data is substantially identical to a configuration data of said failed redundant computer.

15. The control system of claim 12, further comprising a communications unit for communicating via a network selected from the group consisting of: single link and two or more links.

16. A host computer for a control system that includes a plurality of redundant control computers; an interface arranged to control said process or one or more machines; a plurality of redundant connections between said interface and said plurality of redundant control computers, wherein signals for monitoring and or controlling said process or one or more machines are transferred via said interface and said redundant connections between said process or one or more machines and said plurality of redundant control computers, wherein one of said plurality of redundant control computers is a replacement redundant control computer that is electrically connected to a particular one of said redundant connections which was previously electrically connected to a failed redundant control computer, said host computer comprising:
- a processor, a memory and a configurator which is stored in said memory, wherein said processor executes:
- at least a first program instruction of said configurator to assign a network address to said replacement redundant control computer based on a location identifier that is based on said particular redundant connection to said interface;
- at least a second program instruction of said configurator to save a relationship of said location identifier with said network and a configuration data; and
- at least a third program instruction of said configurator to provide said configuration data to said replacement redundant control computer, wherein a second one of said redundant control computers carries on said monitoring and controlling while said failed redundant control computer is being replaced by said replacement redundant computer and while said replacement redundant computer is being configured.

17. The host computer of claim 16, wherein said configuration data is substantially identical to a configuration data of said failed redundant control computer.

18. The host computer of claim 16, further comprising a communication unit that has the capability to communicate with said redundant control computers via a network selected from the group consisting of: single link and two or more links.

19. The host computer of claim 16, wherein said processor further executes:
- at least a fourth program instruction to assign a second network address to a second one of said plurality of redundant control computers based on a second location identifier of a second one of said plurality of redundant connections of said second redundant control computer to said interface;
- at least a fourth program instruction to save a relationship of said second location identifier with said network and an additional configuration data; and
- at least a fifth program instruction to provide said additional configuration data to said second redundant control computer.

20. The host computer of claim 19, wherein said location identifier and said second location identifier are unique to said particular and second redundant connections of said interface to which said replacement redundant control computer and said second redundant control computer are connected, respectively.

21. A memory media for at least a first redundant control computer of a plurality of redundant control computers connected in a control system that includes a host computer, an interface arranged to control a process or one or more machines, a plurality of redundant connections between said interface and said plurality of redundant control computers, wherein signals for
- monitoring and or controlling said process or one or more machines are transferred via said interface and said redundant connections between said
- process or one or more machines and said plurality of redundant control computers, each of said redundant control computers including a processor and a memory, wherein one of said plurality of redundant control computers is a replacement redundant control computer that is electrically connected to a particular one of said redundant connections which was previously electrically connected to a failed redundant control computer, said memory media comprising:
- at least a first program instruction that said processor of said replacement redundant control computer executes to obtain a location identifier from said interface, wherein said location identifier identifies said particular redundant connection that is connected to said replacement redundant control computer;

at least a second program instruction that said processor of said replacement redundant control computer executes to provide said location identifier to said host computer; and at least a third program instruction that said processor of said replacement redundant control computer executes to configure said replacement redundant control computer with configuration data provided by said host computer, wherein said configuration data includes a network address for said replacement redundant control computer that is related to said location identifier, wherein a second redundant control computer carries on said monitoring and controlling while said failed redundant control computer is being replaced by said replacement redundant control computer and said replacement redundant control computer is being configured.

22. A memory media for a host computer connected in a control system that includes a plurality of redundant control computers; an interface arranged to control said process or one or more machines; a plurality of redundant connections between said interface and said plurality of redundant control computers, and said host computer, which comprises a processor and a memory, wherein signals for monitoring and or controlling said process or one or more machines are transferred via said interface and said redundant connections between said process or one or more machines and said plurality of redundant control computers, wherein one of said plurality of redundant control computers is a replacement redundant control computer that is electrically connected to a particular one of said redundant connections which was previously electrically connected to a failed redundant control computer, said memory media comprising:

at least a first program instruction that said processor executes to assign a network address to said replacement redundant control computer based on a location identifier of said particular redundant connection of said replacement redundant control computer to said interface;

at least a second program instruction that said processor executes to save a relationship of said location identifier with said network and a configuration data; and at least a third program instruction that said processor executes to provide said configuration data to said replacement redundant control computer, wherein a second redundant control computer of said plurality of redundant control computers carries on said monitoring and controlling while said failed redundant control computer is being replaced and said replacement redundant control computer is being configured.

* * * * *